United States Patent Office 3,522,489
Patented Aug. 4, 1970

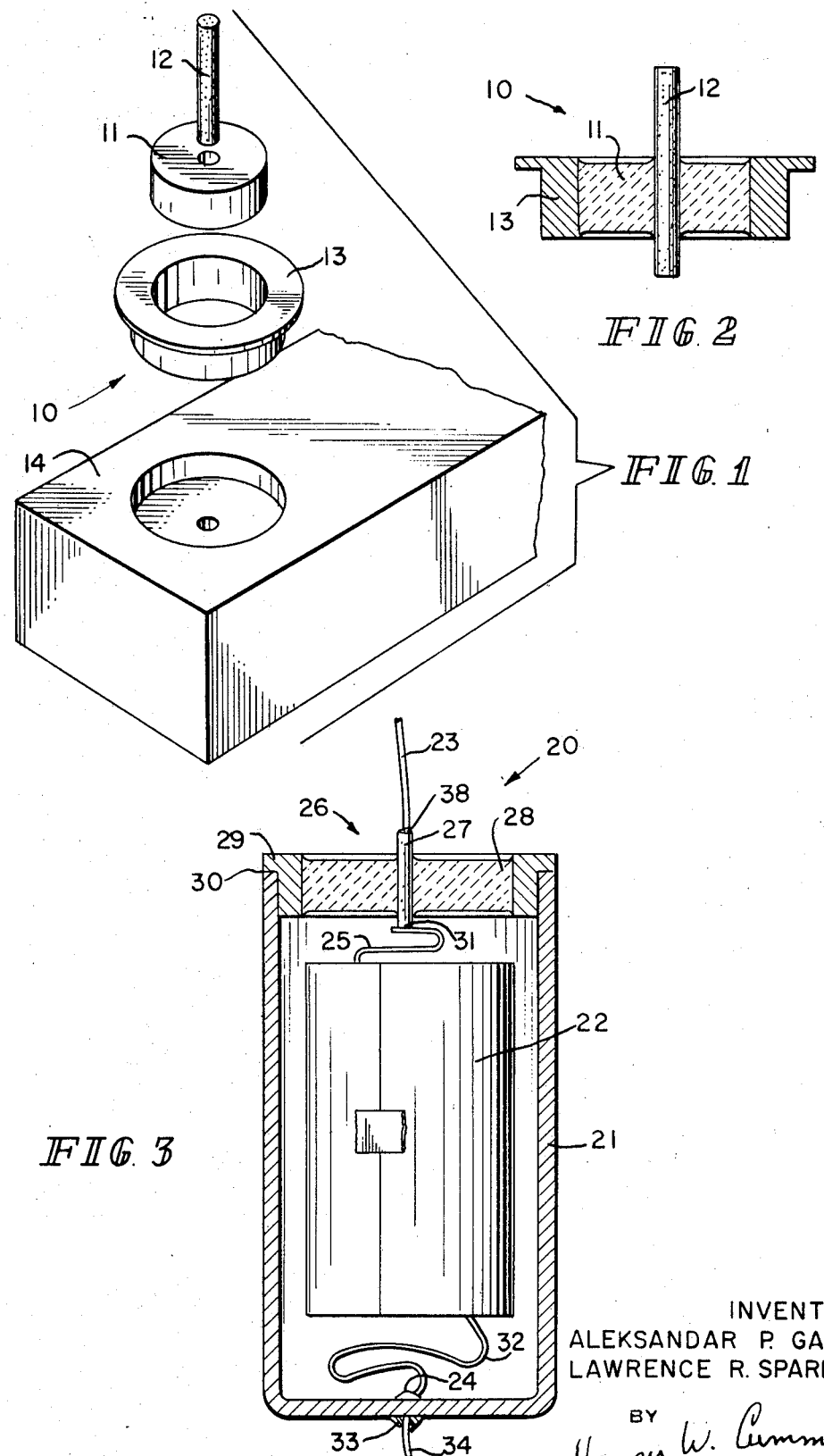

3,522,489
GLASS TO ALUMINUM SEAL AND HERMETICALLY SEALED ALUMINUM ELECTROLYTIC CAPACITOR
Lawrence R. Sparrow, Rockville, Md., and Aleksandar P. Gacic, Palm Bay, Fla., assignors to P. R. Mallory & Co. Inc., Indianapolis, Ind., a corporation of Delaware
Continuation-in-part of applications Ser. No. 504,410, Oct. 24, 1965, and Ser. No. 507,346, Nov. 12, 1965. This application Dec. 4, 1968, Ser. No. 781,021
Int. Cl. H01g 9/00, 9/10
U.S. Cl. 317—230      19 Claims

ABSTRACT OF THE DISCLOSURE

A glass-to-aluminum seal for an aluminum electrolytic capacitor is described which includes an aluminum ring, an aluminum anode terminal member connected to at least one of the aluminum electrodes which projects through the opening in the aluminum ring and a mass of glass filling the opening of the aluminum ring so as to fixedly retain an aluminum terminal member spaced from the aluminum ring. The aluminum ring, aluminum terminal member and glass mass cooperates to form a glass-to-aluminum seal.

---

This application is a continuation-in-part of application Ser. No. 504,410 filed Oct. 24, 1965 and application Ser. No. 507,346 filed Nov. 12, 1965.

The present invention relates to glass-to-aluminum seals and to electrolytic capacitors, and more particularly relates to end-seal constructions which may be used, for example in electrolytic capacitors.

Electrolytic capacitor assemblies generally comprise a container, such as a can, into which a capacitor section is placed. The container, fitted with some type of end-seal, serves to retain the electrolyte necessary for operation of the capacitor. The electrolyte is usually a liquid or a paste and often is of a corrosive nature. Prior art end-seals have not been successful in coping with the problem of electrolyte seepage, leakage and creepage which occur along the boundaries of different materials employed as the sealing means. This problem has been particularly acute in aluminum electrolytic capacitors.

The use of a glass-to-metal seal is known in the art for providing hermetically sealed tantalum capacitors and various other electronic components. However, glass-to-metal compression seals are normally constructed of a central tubular eyelet, through which a capacitor section lead-wire is passed and secured thereto, a mass of glass surrounding and fused to said metal member, and a metal ring or washer surrounding and fused to the glass. This glass-to-metal seal is positioned in the end of the capacitor can and soldered at its periphery to the can wall.

In fabricating hermetically sealed tantalum capacitors, the internal lead wire must also be tantalum. This is then butt-welded to a solderable wire. The point of butt-weld is located about midway within the central tubular metal eyelet, and held in place by solder. When electrolyte creeps along the internal lead-wire to the area of the metal eyelet, an electrolyte bridge is formed between the capacitor case wall and either the eyelet, the solder in the eyelet, the point of butt-weld, or all three. The bridge results in a large increase in the leakage current, which may in a short period of time lead to electrical failure of the capacitor.

A further disadvantage of known hermetic seals is that galvanic corrosion takes place within the eyelet and also between the different metals at the joint where the glass-to-metal seal is soldered to the can wall. This corrosive action eventually will break the solder seal permitting loss of electrolyte. This situation is aggravated by present day requirements of extremely small components where even a minute amount of electrolyte loss can not be tolerated, and wherein extremely high operating temperatures, for example 100 to 200° C. are required.

Not only are the aforementioned problems present in the fabrication of a hermetically sealed aluminum electrolytic capacitor, but there are a number of other factors which heretofore have prevented a satisfactory hermetic seal to be fabricated for aluminum electrolytic capacitors. In an aluminum electrolytic capacitor, the entire capacitor circuit is preferably aluminum or galvanic corrosion results. Further, the metal must be a metal which forms a dielectric oxide, for if such a film cannot be formed on the center portion of the seal, the entire capacitor would be cathodic. The only applicable metals other than alumnum are tantalum and niobium. However, the low melting point and high coefficient of expansion of aluminum which has heretofore prevented the fabrication of glass-to-aluminum hermetic seals presents a problem. If tantalum is used as a center element, there is difficulty in binding it to a glass element having a sufficiently low melting point so that the outer aluminum ring will not melt. Therefore, a glass-to-aluminum seal affords the only feasible answer.

It is an object of the present invention to provide a novel glass-to-aluminum seal.

It is an object of the present invention to provide a hermetic seal for aluminum electrolytic capacitors.

It is an object of the present invention to provide a hermetically sealed aluminum electrolytic capacitor.

It is an object of the present invention to provide a novel aluminum electrolytic capacitor.

It is an object of the present invention to provide a method for obtaining a glass-to-aluminum seal.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein.

For ilustrative purposes, the invention will be described in conjunction with the accompanying drawings in which:

FIG. 1 is an exploded perspective view of the seal assembly shown in relation to a holding means for heat treatment of the seal.

FIG. 2 is a sectional view of the assembled seal.

FIG. 3 is a sectional view of an illustrated embodiment of a hermetically sealed aluminum electrolytic capacitor.

One embodiment of the present invention is directed to a glass-to-aluminum hermetic seal and a method of making same. The seal is obtained by utilizing materials and conditions which are independent of the design geometry of the seal body. The particular seal design will depend upon the capacitor to be sealed. A low melting point, substantially non-conductive glass, having a co-efficient of expansion compatible with that of aluminum, is particularly applicable in the present invention.

Utilizing conventional powder pressing techniques, a predetermined amount of the aforementioned glass is mixed with a suitable binder. There are a number of suitable binders, such as stearic acid, methyl acetate, nitrocellulose, various waxes, etc. The amount of binder used may be for example ½ to 10% by weight of the glass. The mixture is then pressed to obtain pellet 11 as shown in FIG. 1. For example, a removeable core may be used to define the center opening in pellet 11. The geometry and dimensions of the pellet are dependent upon the size of seal 10 and the shape and size of the terminal 12. An aluminum terminal 12, which may be anodized prior to assembly, a glass pellet 11, and aluminum ferrule 13 are assembled in a graphite mold 14. The entire assembly is placed in a suitable furnace and heated to a temperature between 435° C. and 455° C. for ½ to 3 hours, preferably for about 1 hour. The assembly is then removed from the furnace and allowed to cool to room temperature.

The selection of a suitable glass is limited not only by the low melting point and the coefficient of expansion requirements, but is also limited by the conductivity of the glass. A number of low melting point glasses are conductive and therefore inapplicable to the present invention. The most suitable glass to be used in the present invention is substantially nonconductive, has a low melting point, and a coefficient of expansion compatible with that of aluminum. Preferably the glass is a solder glass of the devitrifying type and should have a sealing range between 300° C. and 650° C., and a coefficient of thermal expansion compatible with that of aluminum, for example a coefficient of thermal expansion of $100-130 \times 10^{-7}/°$ C., preferably $110-125 \times 10^{-7}/°$ C. For example one glass which may be used is a devitrifying solder glass which contains a major amount of lead oxide and minor but effective amounts of zinc oxide, boron oxide, barium oxide and silver oxide; for example 70–80% lead oxide, 6–12% zinc oxide, 5–10% boron oxide, 4–8% barium oxide and 1–5% silver oxide.

One example of a devitrifying glass which may be used is sold under the name Kimble CV-9. The glass has a sealing range of 435 to 455° C. for 1 hour, a dielectric constant at 1 megacycle of 20.2, a fiber softening point of 374° C. and an annealing point of 308° C. and a coefficient of thermal expansion of $114-120 \times 10^{-7}/°$ C. This glass has a nominal composition of 74% by weight lead oxide as $PbO$, 9% by weight zinc oxide as $ZnO$, 8% boron oxide as $B_2O_3$, 6% barium oxide as $BaO$ and 3% silicon oxide as $SiO_2$.

However, it will be apparent to those skilled in the art that many other glasses having the previously mentioned properties of substantial non-conductivity, low melting point, and coefficient of thermal expansion compatible with aluminum may be used within the scope of the present invention.

There are a number of ways in which the glass-to-aluminum seal may be fabricated. Using a binder with the glass powder, the glass pellet 11 may be formed and then assembled with, and fused to, the terminal member 12 and outer ferrule 13. Alternately, the pellet may be pressed with either the terminal member 12 or the outer ferrule 13, assembled with the remaining part and then fused. In a third procedure the outer ferrule 13 and the terminal member 12 may be positioned in a suitable mold such as 14, the glass powder packed therebetween, and the resulting assembly heated to effect fusion.

The seal may be attained without the use of a binder by: sintering the pressed glass pellet prior to assembly; or pressing and sintering the pellet to either the terminal member or between the terminal member and the outer ferrule. In any event, the conditions of temperature and time remain from 300° C. to 650° C. for ½ to 3 hours, preferably about 1 hour.

The center terminal element 12 may be anodized before assembly of the seal construction. The outer ferrule 13 may be anodized if the seal is to be used in a non-polar capacitor, but it need not be anodized if it is to be used in a polar capacitor.

According to another embodiment, the present invention provides a hermetically sealed aluminum electrolytic capacitor of both the polar and non-polar variety, which due to the hermetic sealing of the device, exhibits high reliability performance at operating temperatures from −55° C. to +125° C., and further will enable the construction of an aluminum electrolytic capacitor operable up to +200° C.

Referring now to FIG. 3, the illustrative aluminum electrolytic capacitor 20 consists of an aluminum cathode can 21 which houses a foil which may be wound as shown in FIG. 3, electrolyte impregnated capacitor cartridge 22. The electrolyte may be liquid, such as an acid solution, or a solid, such as manganese dioxide. Cathode tab 32 is affixed to can 21 by weld or solder junction 24. Anodized anode tab 25 is then welded to the aluminum terminal member 27 of glass-to-aluminum seal 26 at weld junction 31. After affixing capacitor tabs 32 and 25 to their respective electrical connections, cartridge 22 is inserted into can 21 and seal 26 is affixed thereto thereby effecting a hermetic seal.

Alternatively, an anode for example of aluminum may be welded or otherwise affixed to terminal 27, and an electrolyte poured into the can. With this arrangement cathode tab 32 and welding or solder junction 24, will of course, not be used. Seal 26 is then inserted into the opening in can 21.

Seal 26 comprises a central aluminum anode terminal member 27 having a mass of glass 28 bonded thereto. An outer aluminum ring 29 is bonded to glass 28 and affixed to can 21 by known methods such as ultrasonic welding, electron beam welding, induction soldering or heat sink soldering utilizing special aluminum solders. Anode lead 23 is welded at 38 to anode terminal member 27, and cathode lead 34 is soldered or welded at 33 to cathode can 21.

In a non-polar unit, the formation of anodic film on aluminum parts after assembly is accompanied by gas formation. Therefore, it may be desirable to anodize parts 27 and/or 29 before assembly. In polar units, it is desirable to form oxides on all parts which will be anodic during operation, e.g. anode riser, and terminal member 27.

As was previously mentioned, cathode can 21 is preferably aluminum. However, should further wall strength be required, an aluminum clad with a high strength material such as stainless steel can be utilized. Similarly, if greater strength is desired in the seal, an aluminum clad stainless steel sealing member 29 may be utilized.

The hermetically sealed aluminum electrolytic capacitor of the present invention has a number of advantages over current aluminum electrolytic capacitors. The capacitor, due to the nature of the seal, can operate at higher temperatures than known aluminum electrolytic capacitors. The only temperature limitation is the degradation point of the capacitor paper if an impregnated electrolyte cartridge is used. Higher reliability because of imperviousness to moisture, and the removal of current corrosion because of lead materials are further advantages. A fourth advantage is that a vacuum tight case may be used in space applications without special vacuum protection means.

Although but a representative embodiment of the present invention is hereinabove illustrated and described it will be apparent to those skilled in the art that various changes and modifications may be made therein without departing from the spirit or scope of the appended claims.

We claim:

1. A glass-to-aluminum seal comprising:
    (a) an aluminum member;
    (b) a substantially electrically non-conducting glass body having a melting temperature at most not substantially higher than the melting temperature of aluminum and a coefficient of thermal expansion within a range of about $10^{-5}$ to about $13 \times 10^{-6}$ per ° C. and
    (c) an aluminum ferrule surrounding the glass body, said glass body closing the passageway between, and being integrally bonded to the respective surfaces of said member and ferrule in an hermetic seal.

2. A seal in accordance with claim 1, wherein said sealing range is between 300° and 650° C.

3. A seal according to claim 2 in which said coefficient of thermal expansion is about 110 to $125 \times 10^{-7}/°$ C.

4. A seal according to claim 2 in which said glass is a devitrifying solder glass.

5. A seal according to claim 4 in which the glass contains a major portion of lead oxide and a minor amount of zinc oxide, boron oxide, barium oxide and silicon oxide.

6. A seal in accordance with claim 1 wherein said terminal member is a solid tubular member being substantially longer than said glass and extending from both surfaces of said glass.

7. A seal in accordance with claim 1 wherein said aluminum terminal member is anodized.

8. A seal in accordance with claim 1 wherein said aluminum ferrule is anodized.

9. A seal in accordance with claim 1 wherein both said aluminum terminal member and said outer aluminum ferrule are anodized.

10. A sealed capacitor comprising:
an aluminum housing having an open end; said housing including a cathode portion;
an anode having a dielectric oxide film thereon within, but spaced from said housing;
an electrolyte in contact with said oxide film and with said cathode portion;
lead means for conducting current to and from said anode;
a seal in engagement with the open end of said housing; said seal comprising
 (a) an aluminum member;
 (b) a substantially electrically non-conducting glass body having a melting temperature at most not substantially higher than the melting temperature of aluminum and a coefficient of thermal expansion within a range of about $10^{-5}$ to about $13 \times 10^{-6}$ per ° C. and
 (c) an aluminum ferrule surrounding the glass body, said glass body closing the passageway between and being integrally bonded to the respective surfaces of said member and ferrule in an hermetic seal; said lead means being in electrical engagement with said member; and
 (d) means for securing said ferrule to said housing.

11. A sealed aluminum electrolytic capacitor in accordance with claim 10 wherein said housing is made of aluminum reinforced with a material having greater strength than aluminum.

12. A capacitor according to claim 11 in which said glass is a devitrifying solder glass.

13. A capacitor according to claim 12 in which the glass contains a major portion of lead oxide and a minor portion of zinc oxide, boron oxide, barium oxide and silicon oxide.

14. A capacitor in accordance with claim 10 wherein the sealing range of said glass is between 300° C. and 650° C.

15. A capacitor in accordance with claim 10, wherein said terminal member is a solid tubular member being substantially longer than said glass and extending from both surfaces of said glass.

16. A capacitor according to claim 10 in which said electrolyte is integral with said anode and in which said cathode contact portion is integral with said anode and said electrolyte and in which means for conducting current between said contact portion and said housing are provided.

17. A capacitor according to claim 16 in which electrolyte is liquid.

18. A capacitor according to claim 16 in which said electrolyte is solid.

19. A capacitor according to claim 10 in which said electrolyte is liquid.

References Cited

UNITED STATES PATENTS

| 2,307,561 | 1/1943 | Bailey | 317—230 |
| 2,267,717 | 12/1941 | Brennan | 317—230 |
| 3,139,678 | 7/1964 | Anthony et al. | 317—230 X |
| 3,370,874 | 2/1968 | Scherer et al. | 317—230 X |

JAMES D. KALLAM, Primary Examiner

U.S. Cl. X.R.

174—50.61